United States Patent [19]

Shimakata

[11] Patent Number: 4,627,099
[45] Date of Patent: Dec. 2, 1986

[54] COMMUNICATION APPARATUS FOR TRANSMITTING AND RECEIVING SIGNALS ON DIFFERENT FREQUENCY BANDS

[75] Inventor: Masashi Shimakata, Kawagoe, Japan

[73] Assignee: Pioneer Electronic Corporation, Japan

[21] Appl. No.: 686,581

[22] Filed: Dec. 26, 1984

[30] Foreign Application Priority Data

Dec. 28, 1983 [JP] Japan .................................. 58-245344

[51] Int. Cl.$^4$ ............................................... H04B 1/40
[52] U.S. Cl. ......................................... 455/76; 455/86
[58] Field of Search .................... 455/76, 86, 87, 112, 455/113, 118, 119; 331/22, 31

[56] References Cited

U.S. PATENT DOCUMENTS

| 3,435,367 | 3/1969 | Little, Jr. .............................. 331/22 |
| 4,086,545 | 4/1978 | Teshirogi ............................. 455/76 |
| 4,231,116 | 10/1980 | Sekiguchi et al. .................... 455/87 |
| 4,449,250 | 5/1984 | Kurby ................................... 455/76 |
| 4,450,583 | 5/1984 | Strobel et al. ....................... 455/86 |

Primary Examiner—Jin F. Ng
Attorney, Agent, or Firm—Lowe, Price, LeBlanc, Becker & Shur

[57] ABSTRACT

A communication apparatus comprises a first oscillator for generating a frequency $fp_1$ at each channel step; a second oscillator for generating a modulated frequency $fp_2$; a first mixer for creating a transmission frequency which is a sum $fp_1 + fp_2$ of the frequencies of the first and second oscillators and a difference $fp_1 - fp_2$ therebetween on high and low band transmissions respectively; a third oscillator for generating a frequency $fp_3$ which is higher or lower than the frequency $fp_2$ of the second oscillator by a given frequency $\Delta f$; and a second mixer for creating a sum $fp_1 + fp_3$ of the frequencies of the first and third oscillators means and a difference $fp_1 - fp_3$ therebetween on low and high band transmissions respectively.

23 Claims, 2 Drawing Figures

COMMUNICATION APPARATUS FOR TRANSMITTING AND RECEIVING SIGNALS ON DIFFERENT FREQUENCY BANDS

BACKGROUND OF THE INVENTION

The present invention relates to a communication apparatus and more particularly to a communication apparatus in which one of low and high frequency bands is used for transmission and the other band is used for receiving.

Such conventional apparatus which has been used for an automobile radio communication system is arranged as shown in FIG. 1. An oscillator 1 generates a frequency which is 1/n of a transmission frequency $f_t$ and generally comprises a phase locked loop (PLL). A phase modulator (PM) 2 is adapted to PM modulate the output of the oscillator 1 with an audio input from a microphone 3. A multiplier 4 multiplies an output frequency of the modulator 2 with a number n to provide a transmission frequency $f_t$. A circulator 5 feeds the output of the muliplier 4 which has been amplified by an amplifier (not shown) to an antenna 6 from which r.f. power is emitted. The antenna 6 carries out receiving simultaneously with transmission and the receiving frequency $f_R$ is equal to $f_t \pm \Delta f_1$.

A front end mixer 7 has an input to which a signal received by the antenna 6 is applied via the circulator 5. A multiplier 8 is identical with the multiplier 4. The output of the multiplier 8 is input to the other input of the mixer 7 so that the mixer 7 creates an IF frequency $f_{IF} = f_1$ by using the transmission frequency as a local frequency. A demodulator 9 is adapted to FM or PM demodulate the IF frequency signal. A reference numeral 10 designates a speaker.

The operation of the apparatus as described above will be described by way of a frequency of the U.S. personal radio communication service (hereafter referred to as PRCS).

In PRCS, at the first channel, the transmission frequency $f_t$ is 937,015 MHz, receiving frequency $f_R$ is 898,015 MHz, the frequency interval $f_1 = f_{IF}$ is 39 MHz when transmission is made at a high band. Since one of the frequencies is used for transmission, the other frequency is used for receiving, switching of the frequency is necessary in one set. For example the transmission frequency $f_t$ is 898,015 MHz, the receiving frequency $f_R$ is 937,015 MHz when transmission frequency is in the low band.

The oscillator 1 generates a frequency which is 1/n of the transmission frequency $f_t$ and the oscillation frequency is changed at each high and low band transmissions. The modulator 2 PM modulates the oscillation frequency from the oscillator 1 on high band transmission. Since the PM modulation has 180° modulation factor at maximum, a required modulation factor is provided by frequency multiplication by a multiplier 4.

On reception mode, the oscillation frequency of the oscillator 1 is multiplied by a multiplier 8 and the multiplied frequency signal is used for a local frequency signal of the mixer 7 as a non-modulated signal. This local frequency is an upper local frequency and the IF frequency is equal to the frequency interval $f_{IF} = 39$ MHz.

On low band transmission mode, the modulated signal which is obtained by the oscillator 1, modulator 2, multiplier 4 is emitted from the antenna 6. Since the receiving is made at high band, the output frequency of the multiplier 8 is injected into the mixer 7 as a lower local frequency. The IF frequency $f_{IF}$ is similarly 39.

Since the oscillation frequency of the oscillator 1 should meet the requirements of the channel separation (133 channel, 30 KHz separation in PRCS), the oscillator 1 generates different frequencies at every 30/n KHz. Accordingly if the oscillator 1 comprises a PLL, the internal comparison frequency becomes very low, so that SN ratio (noise level) and tracking performance at frequency change (lock up time) deteriorate.

Accordingly conventional apparatus has disadvantages that the comparison frequency is low so that SN ratio and the suppression of spurious signal is deteriorated since the frequency should be multiplied in the afore-mentioned arranged conventional apparatus. It is also inconvenient since the IF frequency and the frequency interval is fixed at 39 MHz.

SUMMARY OF THE INVENTION

It is therefore an object of the present invention to provide a novel communication apparatus.

It is another object of the present invention to provide a communication apparatus in which frequency multiplication is eliminated by carrying out direct FM modulation in PLL.

In aspect of the present invention there is provided a communication apparatus comprising a first oscillator means for generating a frequency $fp_1$ at each channel step; a second oscillator means for generating a modulated frequency $fp_2$; a first mixer means for creating a transmission frequency which is a sum $fp_1 + fp_2$ of the frequencies of the first and second oscillator means and a difference $fp_1 - fp_2$ therebetween on high and low band transmissions respectively; a third oscillator means for generating a frequency $fp_3$ which is higher or lower than the frequency $fp_2$ of the second oscillator means by a given frequency $\Delta f$; and a second mixer means for creating a sum $fp_1 + fp_3$ of the frequencies of the first and third oscillation means and a difference $fp_1 - fp_3$ therebetween on low and high band transmissions respectively.

DETAILED DESCRIPTION OF THE INVENTION

The present invention will be described by way of an embodiment with reference to the drawings.

Figure 1:
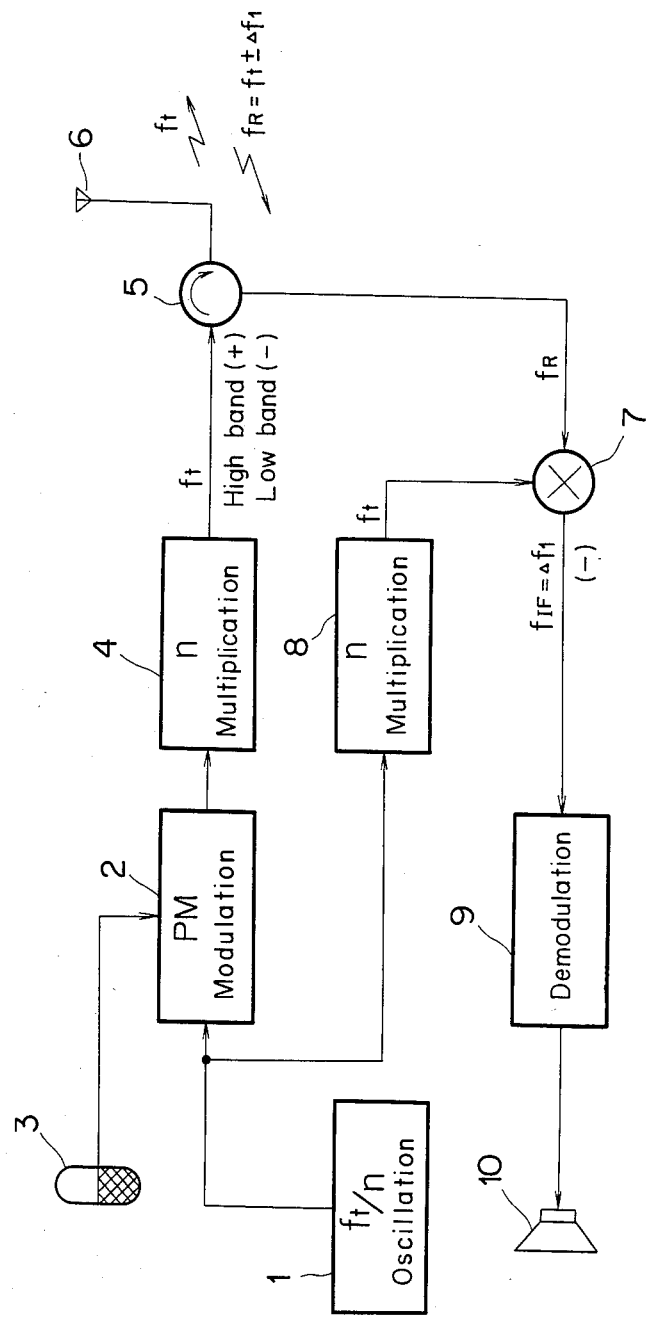
FIG. 1 is a block diagram showing an arrangement of a conventional apparatus.
Figure 2:
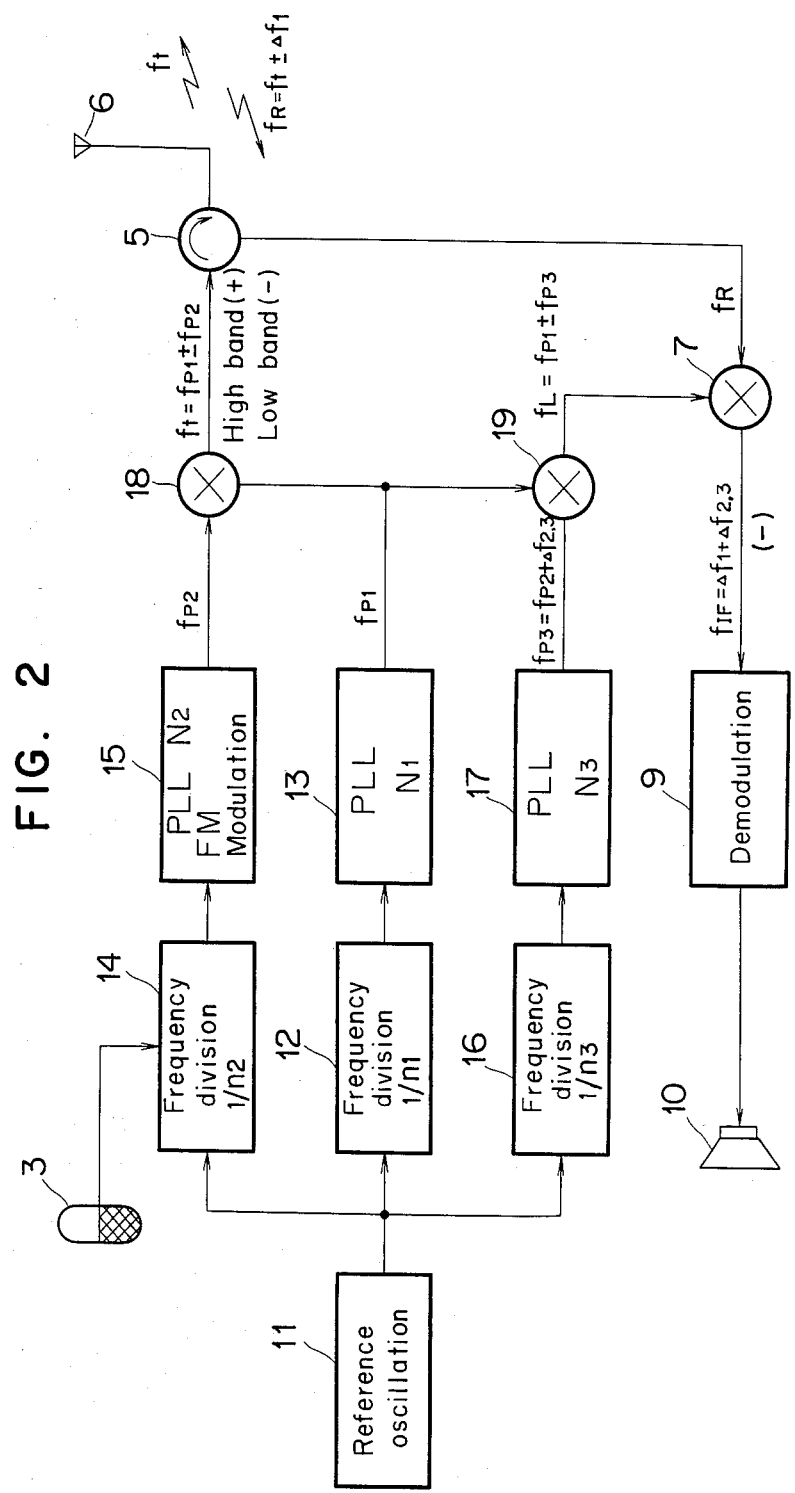
FIG. 2 is a block diagram showing an arrangement of an embodiment of an apparatus of the present invention.

Referring now to FIG. 2, there is shown an arrangement of the apparatus of the present invention. Since like numerals in FIG. 2 which are identical with those of FIG. 1 represent like parts, the description of the like parts is omitted.

Reference numeral represents 11 a reference oscillator, 12, 14 and 16 represent dividers having a dividing ratio of $n_1$, $n_2$ and $n_3$ respectively, 13, 15 and 17 phase locked loops (PLL) which multiply the comparison frequency from the dividers 12, 14 and 16 respectively. These PLLs function as oscillators and PLL 15 also functions as a FM modulator. Accordingly the audio input from a microphone 3 is superimposed on a control voltage of a voltage controlled oscillator (VCO) of the PLL 15. Mixers 18 and 19 mix the outputs of the PLLs 13 and 15 and the outputs of PLLs 13 and 17 to provide a transmission frequency $f_t$ and a local frequency $f_1$ respectively.

The operation of the apparatus which is arranged as described above will be described with reference to a frequency of PRCS.

The PLL 13 is preset so that the comparison frequency is equal to a channel separation 30 KHz and the PLL 13 outputs an oscillation frequency $f_{p1}$ which is obtained by multiplying the comparison frequency with $N_1$. For example, when transmission is carried out at a low band, the comparison frequency is multiplied by $N_1=31028$ to provide $f_{p1}=930;840$ MHz. On transmission at a high band, $N_1=30118$, $f_{p1}=903;540$ MHz.

The PLL 15 has a comparison frequency of 65 KHz and outputs an oscillation frequency $f_{p2}=32.825$ MHz which is obtained by multiplying the comparison frequency with $N_2=505$ on low band transmission and outputs $f_{p2}=33.475$ MHz which is obtained by multiplying with $N_2=515$ or high band transmission.

The PLL 17 has a comparison frequency of 65 KHz and outputs an oscillation frequency $f_{p3}=51.935$ MHz which is obtained by multiplying the comparison frequency with $N_3=799$ on low band transmission and outputs an oscillation frequency $f_{p3}=52.585$ MHz which is obtained by multiplying the oscillation frequency with $N_3=809$.

The afore-mentioned values are calculated and preset depending upon a transmission frequency, receiving frequency, channel steps, frequency intervals, IF frequency and therefore various combinations of the other values are possible. Particularly the IF frequency is preset in accordance with a sum of a difference $\Delta f_{2,3}=f_{p3}-f_{p2}=19.11$ MHz between the oscillation frequency $f_{p3}$ of the PLL 17 and the oscillation frequency $f_{p2}$ of the PLL 15; and a frequency interval $\Delta f_1=39$ MHz and provides $f_{IF}=\Delta f_1+\Delta f_{2,3}=58.11$ MHz. Since this frequency is close to for example a first IF frequency 58.1125 MHz of personal communication, a filter for PC may be used. The IF frequency presetting may be freely carried out.

The frequency $f_{p1}$ is mixed with $f_{p3}$ by means of the mixer 19. The difference $f_{p1}-f_{p3}=878.905$ MHz between these frequencies is a local frequency $f_L$ on the low band transmission (high band receiving). A sum of the frequencies $f_{p1}+f_{p3}=956.125$ MHz is created and is used as a local frequency $f_L$ on the high band transmission (low band receiving).

The local frequency $f_L$ is mixed with a receiving frequency $f_R$ by the mixer 7 and is used as a lower and upper local frequency on high and low band receiving respectively to provide an IF frequency $f_{IF}=|f_r-f_L|=58.11$ MHz. Since the transmission frequency may be directly FM modulated in the PLL 15, a required modulation factor may be provided. Furthermore, the local frequency for receiving is not modulated.

The oscillation frequency of the reference oscillator 11 is a common multiple of the comparison frequency of the PLLs 13, 15 and 17 and may be a frequency which is easy to use and stable. If it is, for example, 12.48 KHz, the divide ratios of the dividers 12, 14 and 16 may be $n_1=1/(2^5\times 13)$, $n_2=n_3=1/(2^6\times 3)$.

Channel switching may be carried out by changing the multiplying number $N_1$ of the PLL 13. The switching of the transmission frequency between the high and low band may be carried out by changing $N_1$, $N_2$ and $N_3$ respectively.

In such an arrangement, the comparison frequency may be relatively higher. Since the PLL is directly FM modulated, frequency multiplying is not necessary and the deterioration in SN ratio, spurious signal generation and the lock up time is eliminated.

Although there is provided a single reference oscillator in the afore-mentioned embodiment, a reference oscillator may be provided for respective PLLs independently from each other. In this case the effects same as those of the afore-mentioned embodiment may be obtained.

Although the oscillation frequency of the PLL 17 $f_{p3}$ is equal to $f_{p2}+\Delta f_{2,3}$ in the afore-mentioned embodiment, this $f_{2,3}$ is arbitrarily preset and may be a sum or difference of them. That is, $f_{p3}=f_{p2}\pm\Delta f_{2,3}$ and the IF frequency is arbitrarily preset as $f_{IF}=\Delta f_1\pm\Delta f_{2,3}$. In this case the effects same as those of the second embodiment may be obtained.

As described above in accordance with the present invention, since there are provided three oscillators and one of them is directly modulated, frequency multiplying is not necessary and the comparison frequency may be higher than that of prior art, deterioration in SN ratio, spurious signal generation, and lock up time is eliminated.

Particularly, if the apparatus is arranged in accordance with the embodiment, communication can be carried out as has heretofore been done by single reference oscillator.

What is claimed is:

1. A communication apparatus for receiving and transmitting signals at different frequencies comprising
   (a) a first oscillator means for generating a frequency $f_{p1}$ at each of a plurality of channels;
   (b) a second oscillator means for generating a modulated frequency $f_{p2}$;
   (c) a first mixer means for creating a transmission frequency which is a sum $f_{p1}+f_{p2}$ of the frequencies of the first and second oscillator means and a difference $f_{p1}-f_{p2}$ therebetween on high and low band transmissions respectively;
   (d) a third oscillator means for generating a frequency $f_{p3}$ which is higher or lower than the frequency $f_{p2}$ of the second oscillator means by a given frequency $\Delta f$; and
   (e) a second mixer means for creating a local oscillator frequency $f_L$ which is a sum $f_{p1}+f_{p3}$ of the frequencies of the first and third oscillation means at high band transmission and low band receiving modes and a difference $f_{p1}-f_{p3}$ at low band transmission and high band receiving modes, and
   (f) third mixer means for mixing a received signal with the local oscillator frequency $f_L$ to provide an intermediate frequency signal $f_{IF}$.

2. The apparatus as defined in claim 1 and further including a circulator between the first mixer means and an antenna for feeding a transmission frequency $f_t=f_{p1}\pm f_{p2}$ to the antenna from the first mixer means.

3. The apparatus as defined in claim 2 and wherein said third mixer means mixes a receiving frequency of a received signal $f_R$ fed via the circulator with the local oscillator frequency $f_L$ from the second mixer means to provide an intermediate frequency $f_{IF}=|f_L-f_R|$.

4. The apparatus as defined in claim 3 in which the receiving frequency $f_R$ is equal to the transmission frequency $f_t\pm$ an transmission-receiving frequency interval $\Delta f_1$.

5. The apparatus as defined in claim 4 in which the intermediate frequency $f_{IF}$ is determined as a sum of the transmission receiving frequency interval $\Delta f_1$ and a difference $\Delta f_{2,3}$ between the frequencies $fp_2$ and $fp_3$ of the second and third oscillator means.

6. The apparatus as defined in claim 5 in which the frequency difference $\Delta f_{2,3}$ is 19.11 MHz and the frequency interval $\Delta f_1$ is 39 MHz so that the intermediate frequency $f_{IF}$ is 58.11 MHz.

7. The apparatus as defined in claim 3 and further including a demodulator which demodulates the intermediate frequency signal.

8. The apparatus as defined in claim 3 in which the local frequency $f_L$ from the second mixer means is injected into the third mixer means as lower and higher local frequencies at high and low band receiving modes respectively.

9. The apparatus as defined in claim 1 in which the second mixer means creates a local frequency $fp_1 - fp_3 = 878.905$ MHz at low band transmission and high band receiving modes and a local frequency $fp_1 + fp_3 = 956.125$ MHz at high band transmission and low band receiving modes.

10. The apparatus as defined in claim 1 in which the first, second and third oscillator means include a first, second and third phase locked loops (PLLs) respectively.

11. The apparatus as defined in claim 10 in which the first PLL which forms the first oscillator means has a comparison frequency identical with a channel separation.

12. The apparatus as defined in claim 11 in which the channel separation is 30 KHz and the first PLL provides an oscillation frequency $fp_1$ which is obtained by multiplying the channel separation by an integer $N_1$.

13. The apparatus as defined in claim 12 in which $N_1$ is 31028 and $fp_1$ is 930.849 MHz at a low band transmission mode and in which $N_1$ is 30118 and $fp_1$ is 903.540 MHz at a high band transmission mode.

14. The apparatus as defined in claim 12 further comprising means for switching communication channels by changing $N_1$.

15. The apparatus as defined in claim 10 in which the second PLL forming the second oscillator means has a comparison frequency which is 65 KHz and provides a frequency $fp_2$ which is obtained by multiplying the comparison frequency by an integer $N_2$.

16. The apparatus as defined in claim 15 in which $N_2$ is 505 and $fp_2$ is 32.825 MHz at a low band transmission mode and $N_2$ is 515 and the $fp_2$ is 33.475 MHz at a high band transmission mode.

17. The apparatus as defined in claim 16 in which direct FM modulation is made in the second oscillation means.

18. The apparatus as defined in claim 10 in which the third PLL forming a third oscillator means has a comparison frequency which is 65 KHz and provides a frequency $fp_3$ which is obtained by multiplying the comparison frequency by an integer $N_3$.

19. The apparatus as defined in claim 18 in which $N_3$ is 799 and $fp_3$ is 51.953 MHz at a low band transmission mode and the $N_3$ is 809 and the $fp_3$ is 52.585 MHz at a high band transmission mode.

20. The apparatus as defined in claim 10 and further including a reference oscillator and a first, second and third frequency dividers having a division ratios $N_1$, $N_2$ and $N_3$ respectively between the reference oscillator and the respective first, second and third oscillator means.

21. The apparatus as defined in claim 20 in which the oscillation frequency of the reference oscillator is a common multiple of the comparison frequencies of the first, second and third PLLs.

22. The apparatus as defined in claim 21 in which the oscillation frequency of the reference oscillator is 12.48 MHz and the frequency division ratio of the first frequency divider $N_1$ is $\frac{1}{2}^5 \times 13$ and the frequency division ratios of the second and third frequency dividers $N_2$ and $N_3$ are $\frac{1}{2}^6 \times 3$.

23. The apparatus as defined in claim 20 in which transmission frequency is changed when high and low band modes are switched by changing the frequency division ratios $N_1$, $N_2$ and $N_3$.

* * * * *